United States Patent
Fenton, Jr. et al.

(10) Patent No.: US 6,491,778 B1
(45) Date of Patent: Dec. 10, 2002

(54) BENT TIP COMPOSITE GOLF SHAFT

(76) Inventors: Francis A. Fenton, Jr., 4667 Country Manor Dr., Sarasota, FL (US) 34233; Peter J. Piotrowski, 15 Lost Meadow Trail, Austin, TX (US) 78738

( * ) Notice: Subject to any disclaimer, the term of this patent is extended or adjusted under 35 U.S.C. 154(b) by 0 days.

(21) Appl. No.: 09/436,242

(22) Filed: Nov. 9, 1999

(51) Int. Cl.⁷ .............................. B32B 1/08; B32B 5/02; B32B 5/28; A63B 53/10
(52) U.S. Cl. ...................... 156/184; 156/294; 473/319; 473/321; 264/313
(58) Field of Search .................... 473/320, 319, 473/321; 425/393; 156/157, 293, 294, 184; 264/313, 339

(56) References Cited

U.S. PATENT DOCUMENTS

| | | | | |
|---|---|---|---|---|
| 801,759 A | * | 10/1905 | Woolridge | 15/104.33 |
| 3,464,879 A | * | 9/1969 | Poulsen | 156/425 |
| 4,110,396 A | * | 8/1978 | Reynolds | 264/236 |
| 4,158,586 A | * | 6/1979 | Usui | 156/175 |
| 4,233,787 A | * | 11/1980 | Piazza | 52/125 |
| 4,500,485 A | * | 2/1985 | Willemsen | 264/313 |
| 5,384,085 A | * | 1/1995 | Houser | 264/313 |
| 5,413,338 A | * | 5/1995 | Kawamatsu | 273/80 |
| 5,424,015 A | * | 6/1995 | Matsuda | 264/130 |
| 5,899,816 A | * | 5/1999 | Pearson | 473/265 |

\* cited by examiner

Primary Examiner—Michael W. Ball
Assistant Examiner—Justin Fischer
(74) Attorney, Agent, or Firm—Welsh & Flaxman LLC

(57) ABSTRACT

A method of making a golf club shaft with a bent angular tip using a main shaft body mandrel and a secondary tip mandrel disposed at an angle therewith and a mandrel apparatus for the same.

3 Claims, 11 Drawing Sheets

BENT TIP COMPOSITE GOLF SHAFT

BACKGROUND OF THE INVENTION

The present invention relates to composite golf shafts and in particular to a combination of methods for molding the tip of a golf shaft at a precise angle.

Traditionally golf club shafts have been made straight tapering from a butt section to a narrower tip section which is inserted into the hosel of a golf club head. Typically the butt section includes a grip to enable a golfer to swing the golf club. With the advent of sophisticated molding techniques, it is no longer necessary for the golf club shaft to be at a straight angle. For example, it is well known for putters to have the tip portion of the shaft bent at a precise angle in order to position a golfers hands in a desired location. Similarly, in my U.S. Pat. No. 5,931,741, a hoselless golf club is disclosed using a single bent shaft, the bend being such that the shaft may enter the club face at various locations and vary between a minimum of five degrees to a maximum of 180 degrees depending in part upon the loft angle of the golf club head.

Other patents of interest are U.S. Pat. No. 3,166,320 to Onions and U.S. Pat. No. 5,255,914 to Schroder, both of which show a wood type golf club head with a hosel and having a bent steel shaft tip which is angularly offset from the main elongated shaft portion of the club.

U.S. Pat. No. 5,465,959 to Cheng relates to a golf club shaft made of a composite material such as carbon graphite fiber and having a bent front section connected to a bent shaft section using a uniform diameter link to couple the parts together. The bent section is formed by wrapping a core with carbon fiber fabric and then thermally pressing it to form the desired shape.

U.S. Pat. No. 5,409,220 to Lombardo shows a putter type golf club head having a bent shaft with the tip offset approximately 20 degrees from the main portion of the shaft. The patent discloses the shaft as being a metal tube substantially hollow between its ends.

The present invention relates to a carbon fiber graphite composite shaft having a bent tip and to a method of making the same. Carbon fiber graphite composite golf shafts are known to be manufactured using a variety of fibers including carbon fiber, fiberglass, Kevlar and the like with carbon fiber being the predominate fiber used. The material is commonly called prepreg or prepreg composite. In a preferred embodiment of manufacturing a bent composite shaft for golf clubs, a mold is fabricated having dimensions specified by the size of the shaft. Two mandrels, a tip mandrel and a main body mandrel, are used with a conventional bladder. The tip mandrel is inserted into the tip end of the bladder at the desired angle, and the main body mandrel is inserted into the opposite end of the bladder, allowing approximately a two inch gap separating the two mandrels inside the bladder at the point where the angle is to be molded in the shaft. The prepreg composite material is then wrapped over the entire bladder and mandrel assembly. The material wrapped over the bend angle area preferably is an intermediate modulus high strain prepreg material or other high strain material such as glass fiber for added strength in this section where additional stresses will occur when a golf ball is struck. All of the wrapped assembly is placed in the mold and compression molded to 300 degrees Fahrenheit for 7–10 minutes or up to 2.5 hours at 250 degrees F. The formed shaft is removed from the press and the mandrels removed. The shaft surface is prepared for finishing, light sanding or other abrasive treatments, as required. Additionally paint may be applied.

An alternate method of producing a composite bent shaft uses a single long one piece flexible mandrel which may be made of flexible silicone or rubberized material, flexible round spiral metal or flexible solid metal. Alternately the above two methods may eliminate the use of an intermediate bladder. When the bladder is not used, the prepreg material is wrapped directly over the mandrels. A mandrel puller will be required to assist in removing mandrels if a bladder is not used.

Still another method contemplates using a permanent elbow connection such as a plastic or rubberized piece that would fit between the two separate tip and main body mandrels which fills the gap between the two mandrels. This elbow connection used without a bladder, permanently remains inside the shaft after the mandrels are removed.

Still other alternate methods includes a mechanical connection between the two mandrels including a screw or mortise and tenon connection for holding the mandrels together.

Still another method is to butt the two ends of the two mandrels up against each other at the desired angle.

Still another method uses a scrim wrap to connect a solid or flexible tip mandrel to a main body mandrel.

An object of the present invention is the provision of a composite golf club shaft having a bent or angular tip section and methods of making the same.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
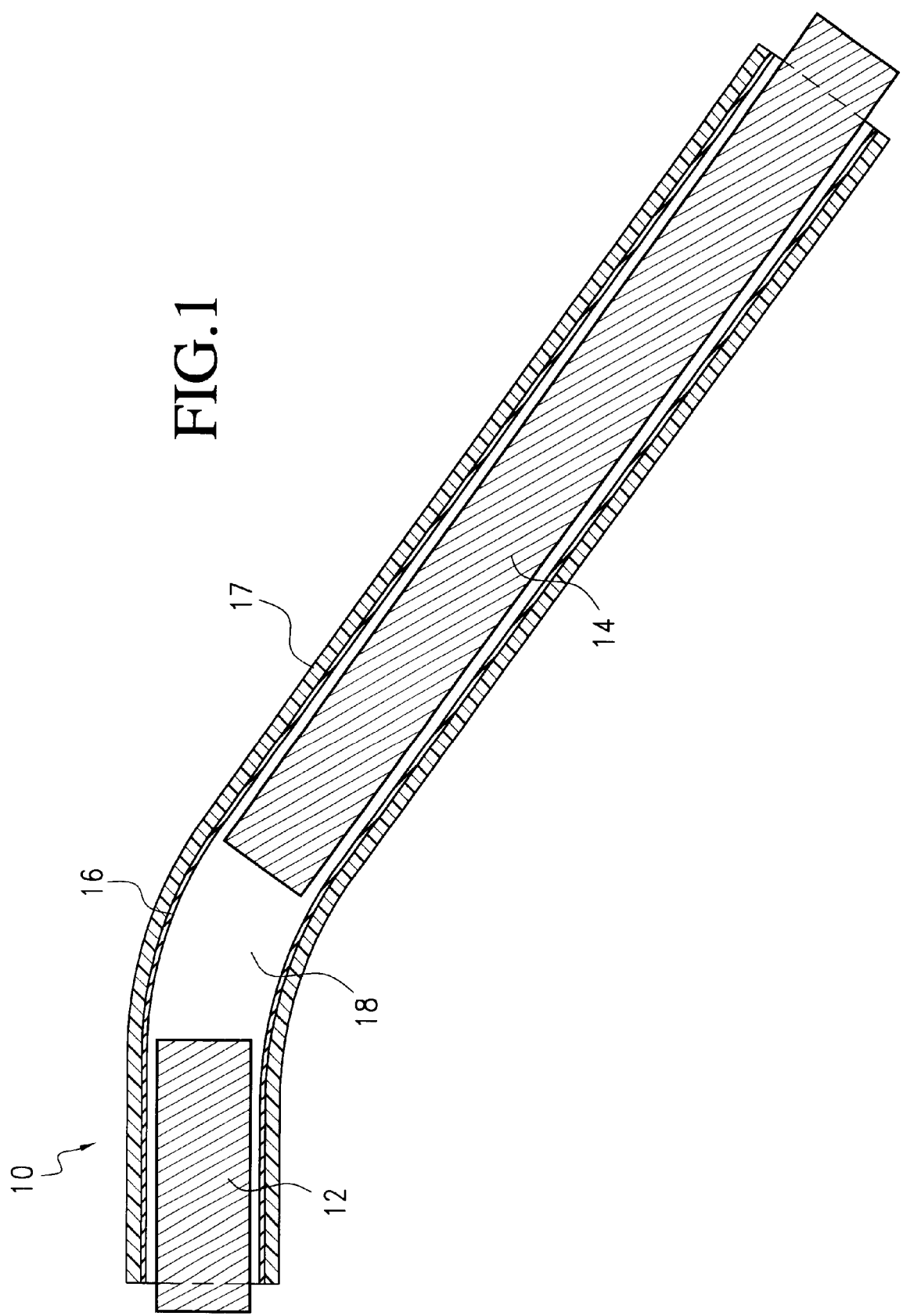
FIG. 1 is a sectional view of a first embodiment of the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

The present invention is directed to golf club shafts having a bent tip structure of the type disclosed in my U.S. Pat. No. 5,931,741 for a hosel-less golf club with a single bent shaft. The patent describes a golf club where in a golf club shaft is bent so as to be directly inserted into the ball striking face adjacent to heel of the golf club head to totally eliminate the need for a shaft hosel. The shaft enters the club face at various locations and the bend of the shaft may vary between a minimum of five degrees to a maximum of 180 degrees depending upon the loft angle of the particular club head. The present invention describes a number of methods and structures used therewith for producing golf club shafts of composite or graphite material suitable for use with the golf club described in the above patent.

In a preferred method for making a golf club shaft, a mold is formed sized to the length and outside diameter of the shaft dimensions. It will be appreciated that the butt end of a shaft generally has a greater diameter and gradually tapers toward the tip. In a preferred method, composite prepreg material is wrapped around an inner mandrel, which may or may not include an inner bladder. The wrapped mandrel is placed in the mold and the shaft is cured under suitable heat and pressure. Once the shaft materials are cured, the mandrel is removed and the shaft is then finished by sanding, coating, painting or the like. It will be appreciated that the present invention is equally applicable with various shaft fibers including carbon graphite, Kevlar, fibreglass, and similar materials with a thermoset or thermoplastic resin matrix and may use well known manufacturing methods such as the lay up method, balloon molding, filament winding, autoclave molding, compression molding and the like. The shaft fibers may be oriented in a variety of angular configurations depending upon the shaft characteristics sought.

In producing composite single bent graphite shafts in accordance with the present invention preferably the overall length of the finished shaft would be approximately 44 inches with a weight of 75 grams, for example. The tip end would be made stiffer and formed with an outside diameter of 0.370 inches and disposed at a tip angle of approximately 20 degrees. The butt end has a outside diameter of approximately 0.60 inches with the outside diameter of the shaft gradually tapering between the smaller tip section to the larger butt section. However, it will be appreciated that the present invention is equally applicable to golf club shafts which do not gradually taper but include various configurations such as bulges, parallel sections, reduced radiuses and so forth.

Referring to FIG. 1, a mandrel assembly 10 for making a composite graphite shaft with a bent tip is shown including a tip mandrel 12 a main shaft body mandrel 14 and a covering bladder 16. In this embodiment there is a gap 18 between the tip mandrel 12 and the main shaft body mandrel 14 with no connection enabling the tip mandrel 12 to be placed at a desired angle with the main shaft body mandrel 14. In this embodiment preferably the main shaft body mandrel 14 is solid steel. The tip mandrel 12 is shown as solid steel, but it may be flexible metal or even a flexible silicone or rubberized material. It will be appreciated that the mandrel assembly 10 is wrapped with prepreg material 17 which actually forms a shaft during the curing process. The material is formed in a mold and cured as described hereinabove in the background of the invention. When the cure is finished, the tip mandrel 12 and the shaft mandrel 14 may be withdrawn from opposite ends of the completed shaft having a bent tip configuration.

Figure 2:
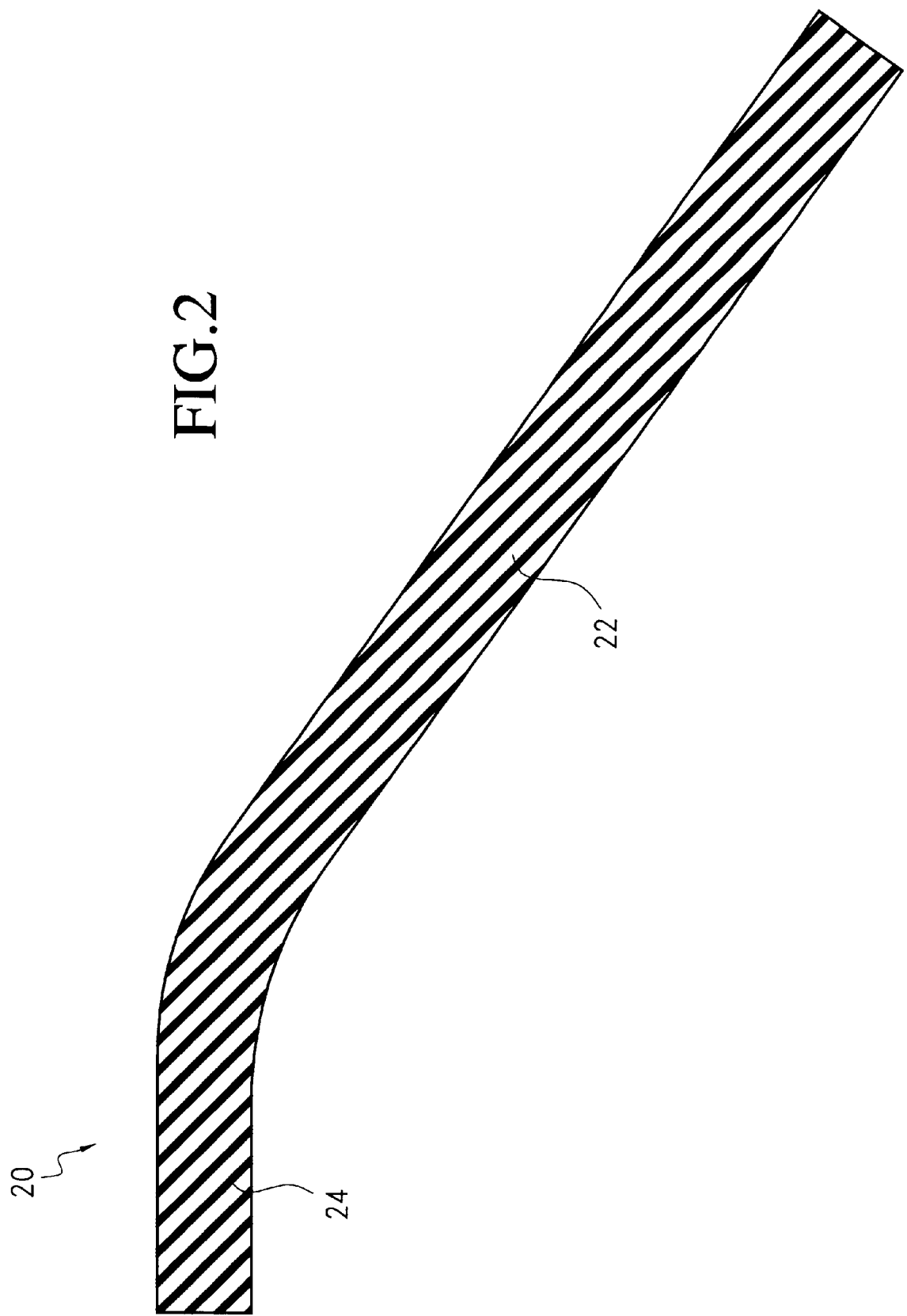
FIG. 2 is a sectional view of a second embodiment of the present invention.

FIG. 2 illustrates a unitized, one piece mandrel 20 made of silicone rubberized material having a main body section 22 and a bent tip section 24 to form the desired shaft configuration. In this embodiment the mandrel 20 is removed by pulling it out of the butt end of the cured shaft. The flexibility of the mandrel allows the tip section 24 to straighten as pulling pressure is applied and be easily removed.

Figure 3:
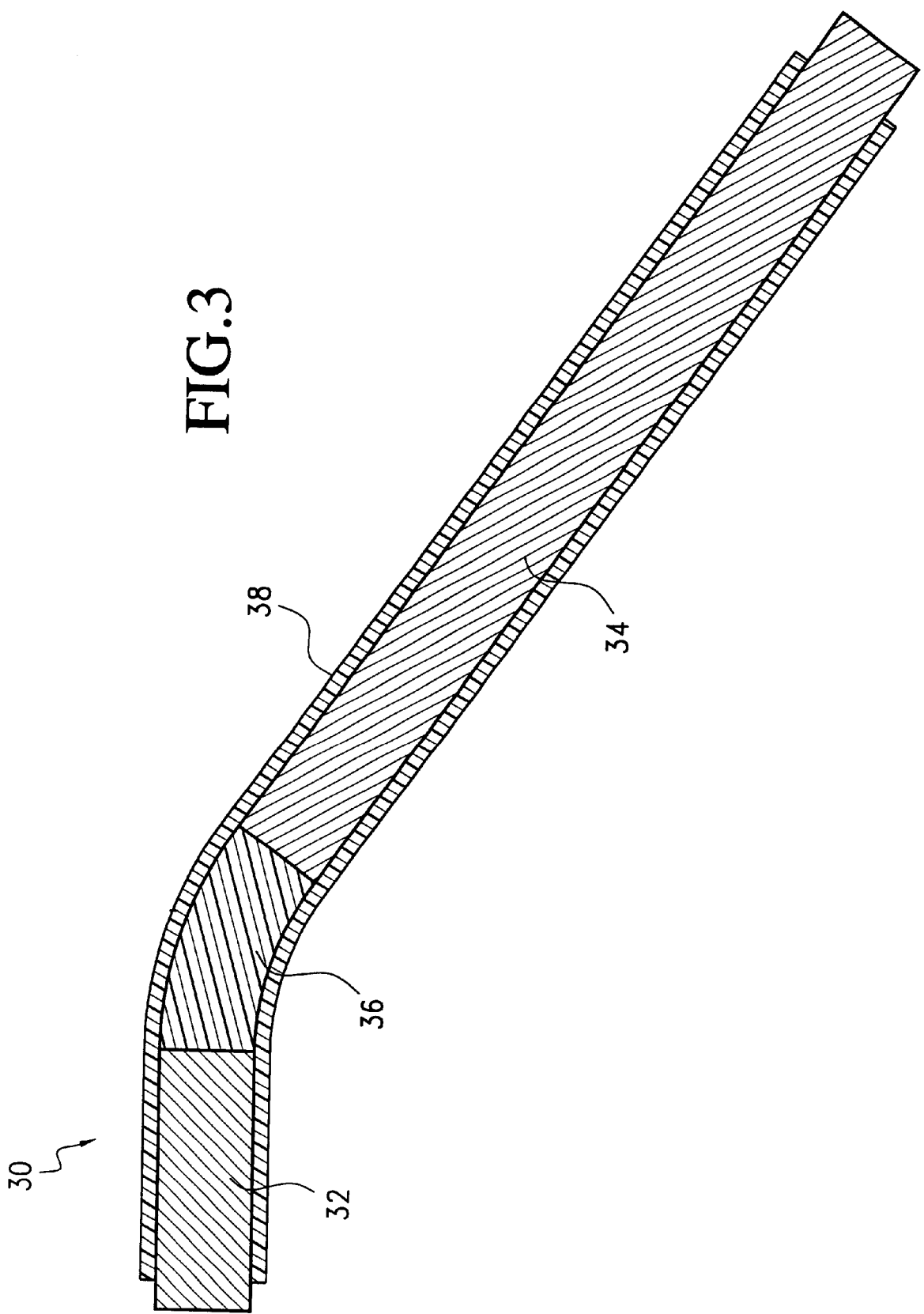
FIG. 3 is a sectional view of a third embodiment of the present invention.

FIG. 3 illustrates a mandrel assembly 30 in accordance with present invention using a tip mandrel 32, a main shaft body mandrel 34 and a shaped permanent elbow 36. In this embodiment the permanent elbow 36 preferably is made of a rubber or plastic material and inserted between a steel tip mandrel 32 and steel main shaft body mandrel 34. After mandrels 32 and 34 are wrapped with prepreg composite material 38 and cured the mandrels 32 and 34 are removed leaving the permanent elbow 36 in place to add to the rigidity of the shaft at the point of the bend.

Figure 4:
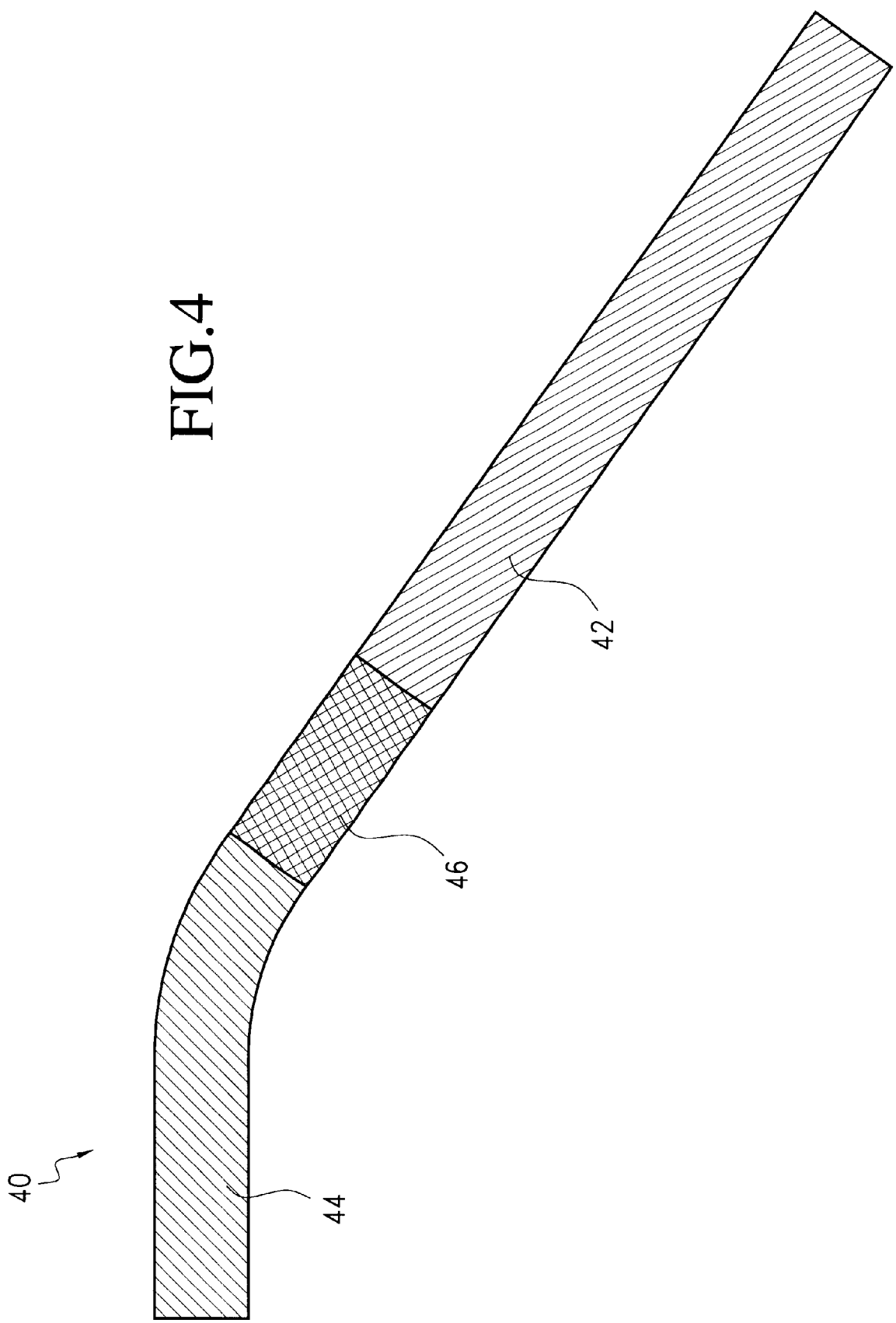
FIG. 4 is a sectional view of a fourth embodiment of the present invention.

FIG. 4 shows another variation of a mandrel assembly 40 including a main shaft body mandrel 42 of steel, a flexible tip mandrel 44 which may be silicone or rubberized material, flexible solid metal or flexible wound spiral metal. In this embodiment a scrim wrap 46 is provided over the ends of each mandrel 42 and 44 forming a connection therebetween. The assembly may be covered with a bladder, and wrapped with prepreg material and cured as with previous embodiments. The mandrels 42 and 44 are removed from the shaft after it is cured.

Figure 5:
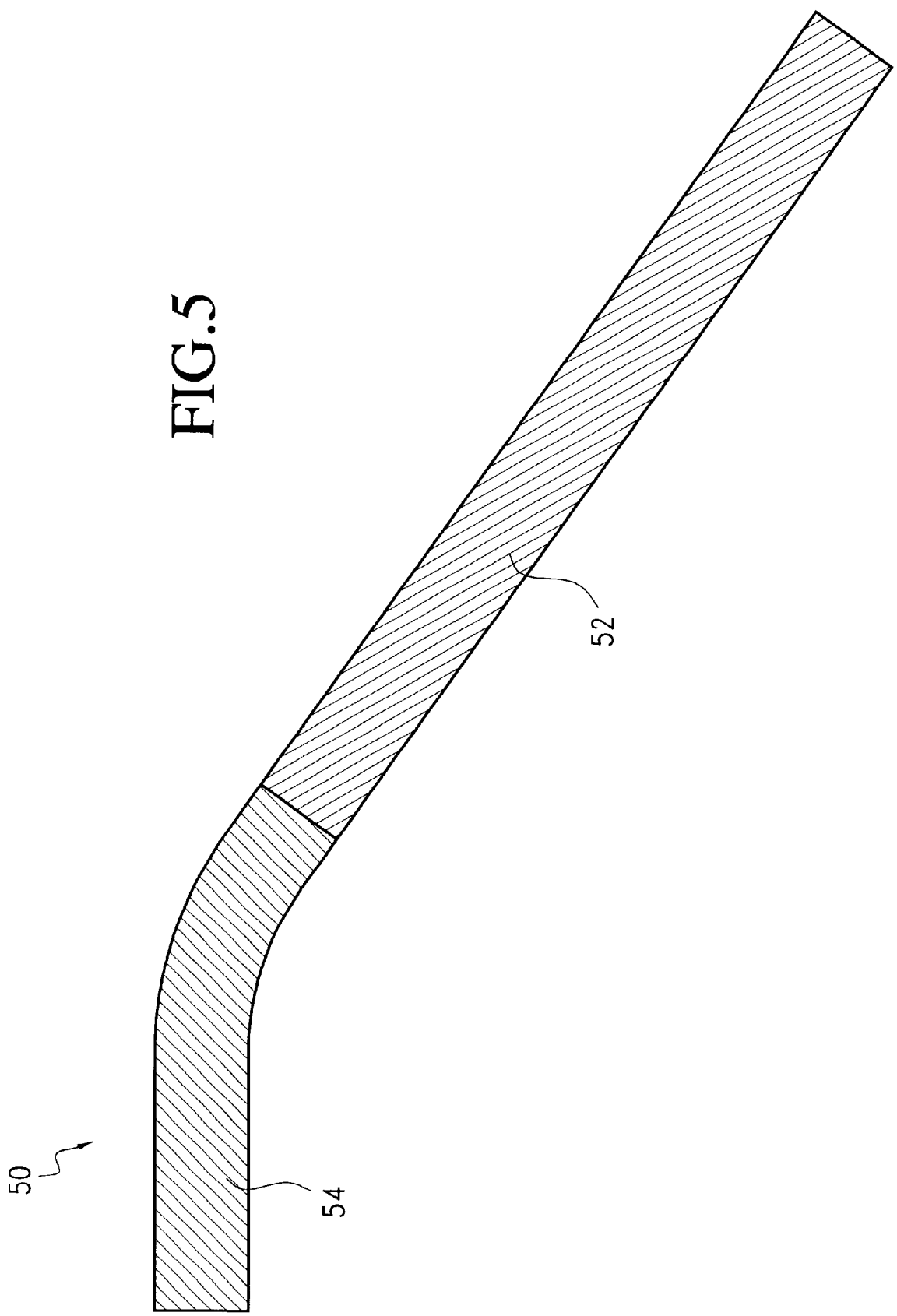
FIG. 5 is a sectional view of a fifth embodiment of the present invention.

FIG. 5 illustrates still another mandrel assembly 50 using a steel main shaft body mandrel 52 and a tip mandrel 54 of solid flexible metal. The inner ends of the mandrel 52 and the mandrel 54 abut each other and then may be covered with a bladder wrapped with prepreg material and cured to form a bent tip shaft.

Figure 6:
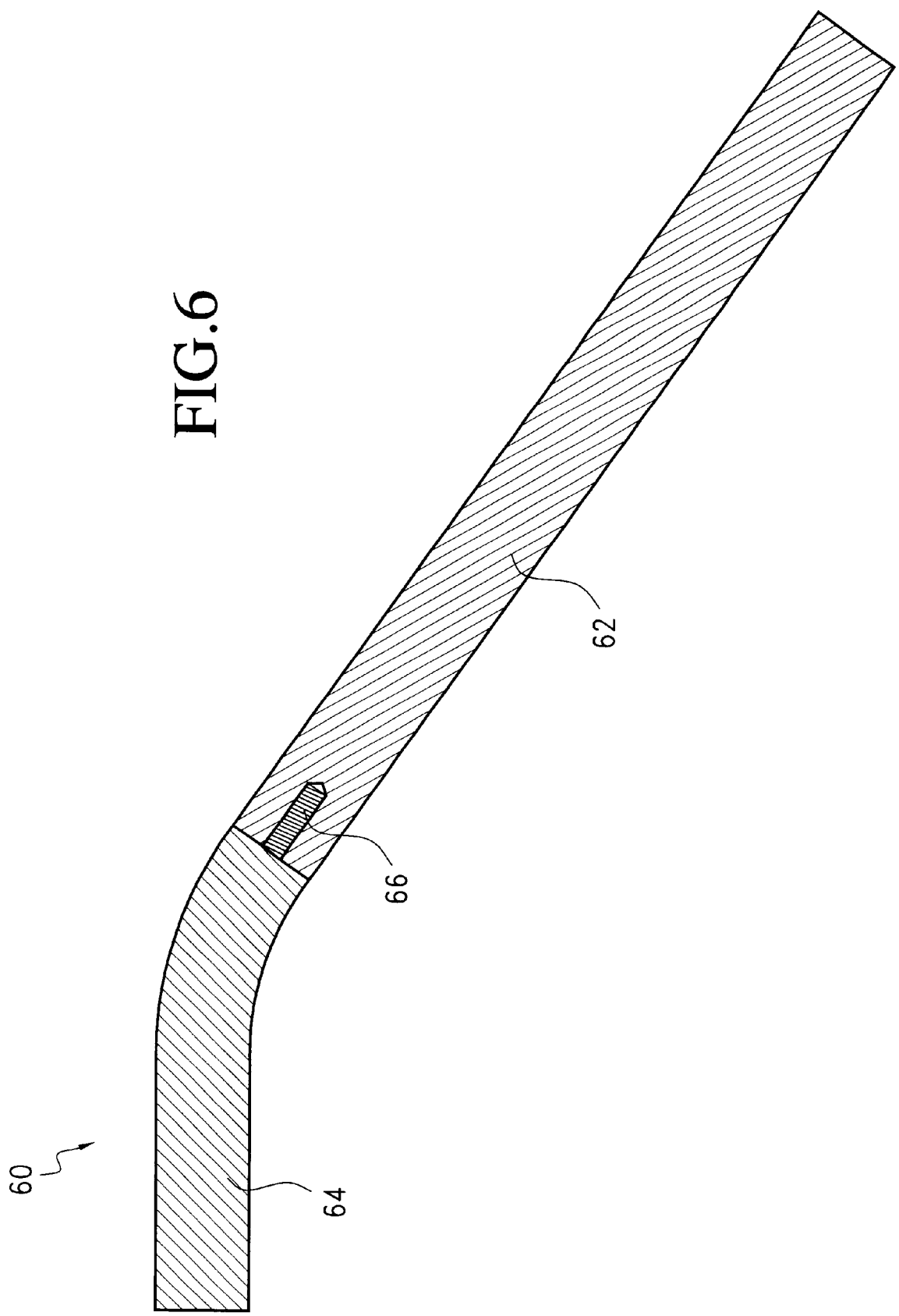
FIG. 6 is a sectional view of a sixth embodiment of the present invention.

FIG. 6 shows yet another embodiment of a mandrel assembly 60 using a steel main body mandrel 62 and a flexible tip mandrel 64 which uses a connector screw 66 to make a solid connection between the mandrels. As with the previous embodiment the mandrels may be covered with a bladder, wrapped and cured.

Figure 7:
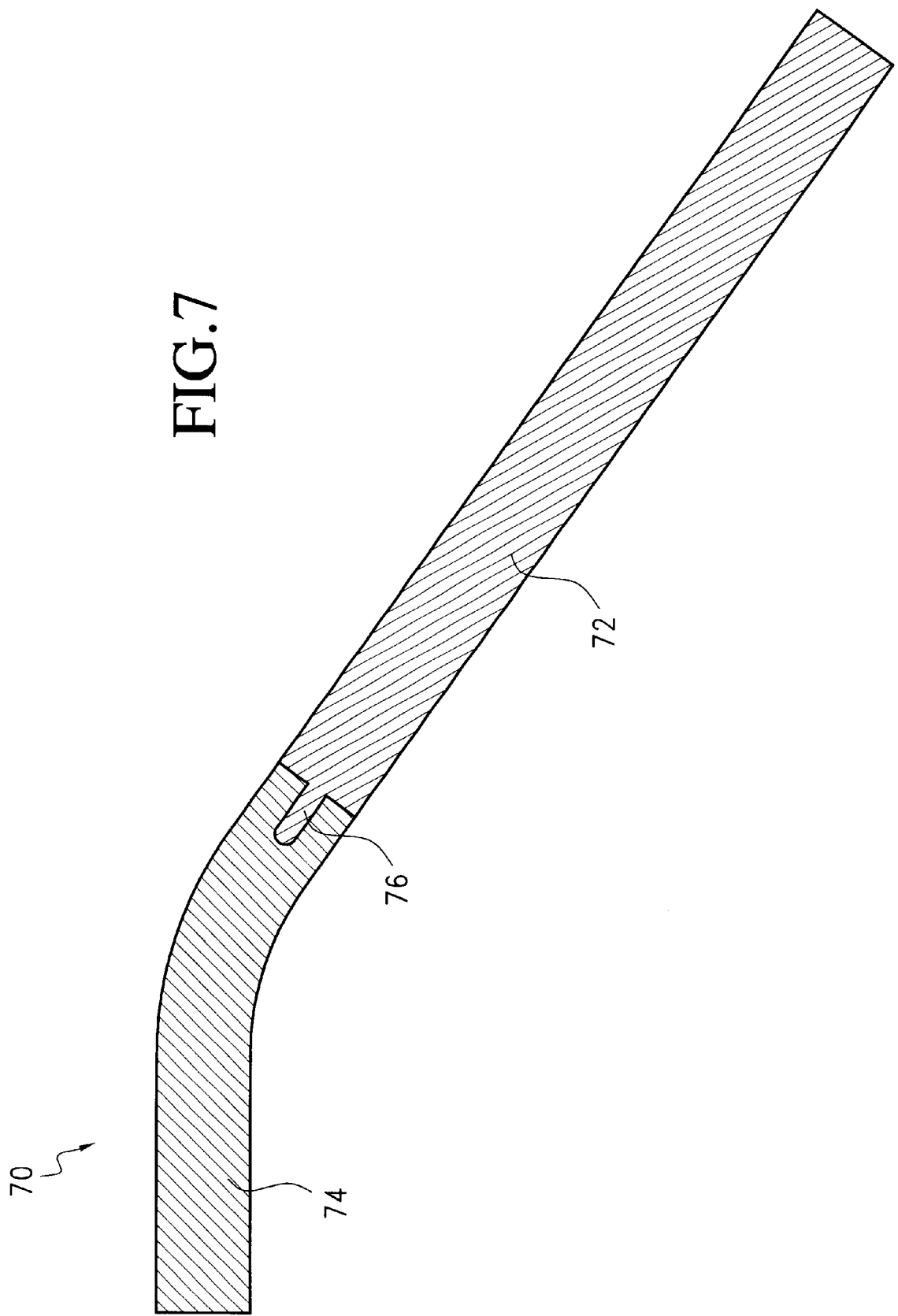
FIG. 7 is a sectional view of a seventh embodiment of the present invention.

FIG. 7 illustrates a further embodiment of a mandrel assembly 70 including a main shaft body mandrel 72 and flexible mandrel 74 wherein the tip of the main body mandrel 72 and the adjoining tip of the flexible mandrel 74 are connected by a mortise and tenon joint 76. The assembly may include a bladder which is wrapped by prepreg and cured.

Figure 8:
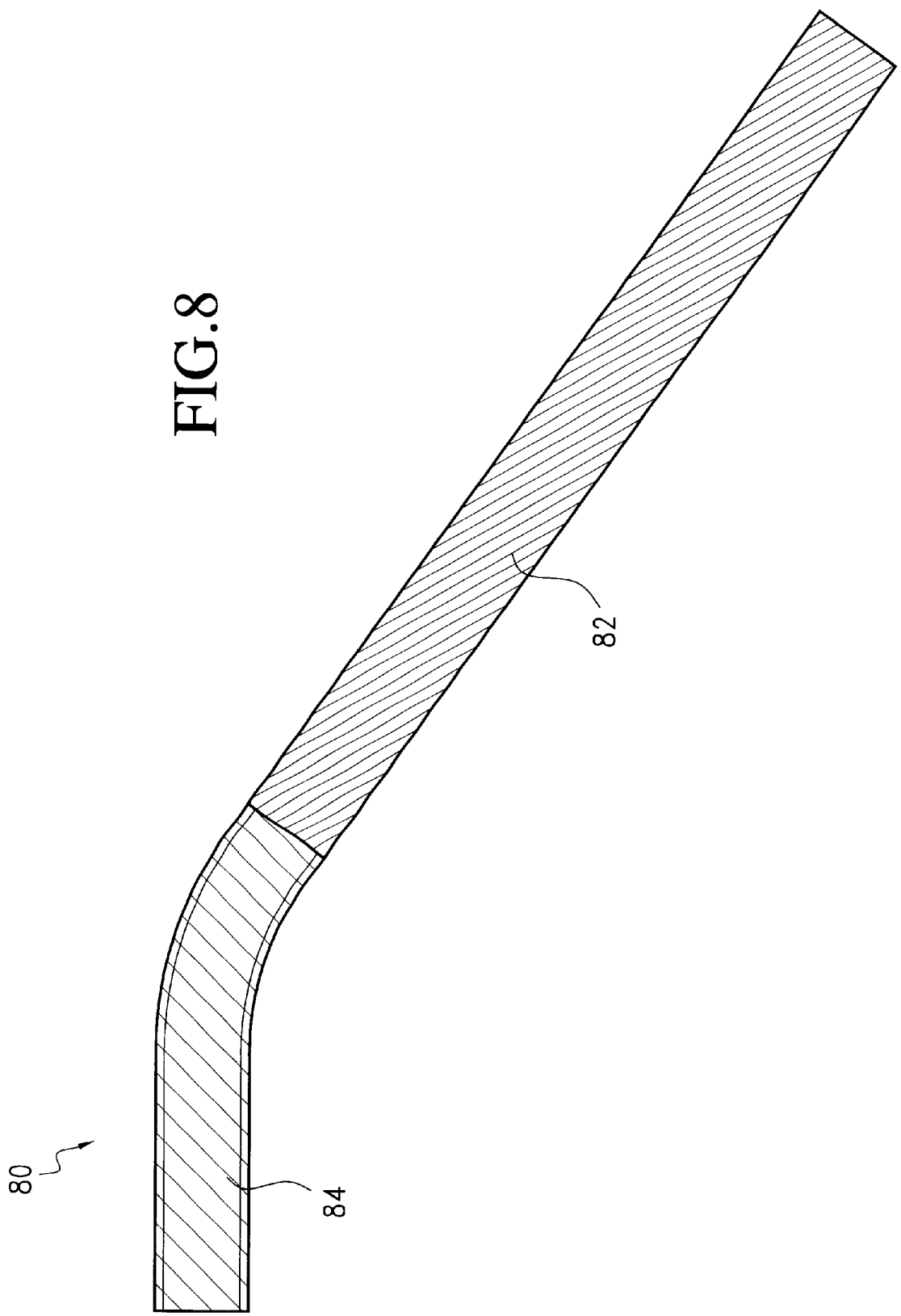
FIG. 8 is a sectional view of a eighth embodiment of the present invention.

FIG. 8 shows an embodiment of a mandrel assembly 80 including a solid main shaft body mandrel 82 and a flexible wound spiral metal tip 84. The assembly 80 may be covered with a bladder wrapped and cured. It will be appreciated that the flexible wound spiral metal tip 84 may be used with and without a connection to the main shaft mandrel 82 including a gap, a butt against connection, a screw connection, a scrim wrap connection or a mortise and tenon connection of the type described hereinabove.

Figure 9:
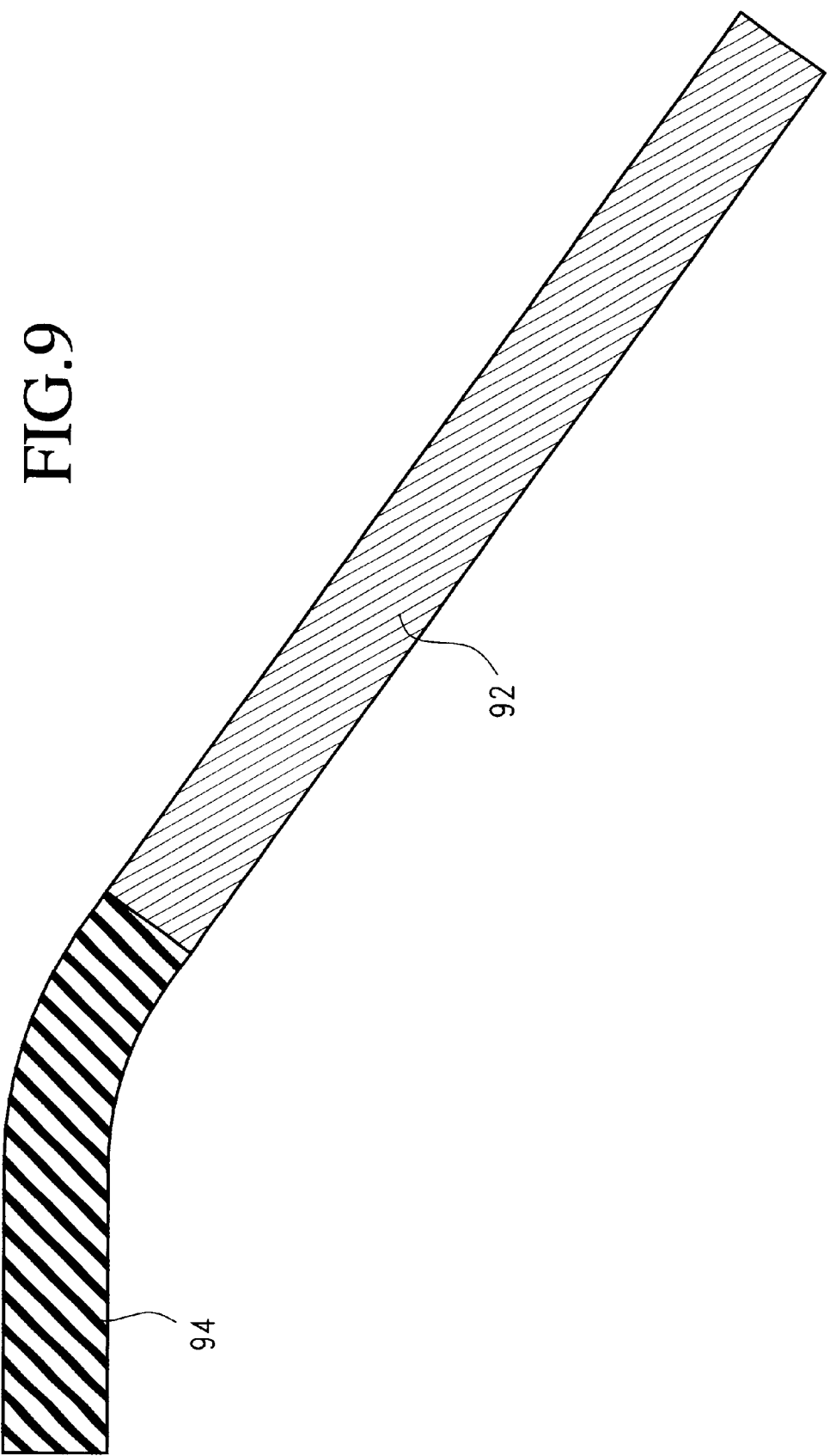
FIG. 9 is a sectional view of a ninth embodiment of the present invention.

FIG. 9 shows another embodiment of a mandrel assembly 90 using a main body mandrel 92 and a flexible tip mandrel 94 made of silicone rubberized material. The ends of each mandrel 92 and 94 abut against each other and may be wrapped with a bladder.

Figure 10:
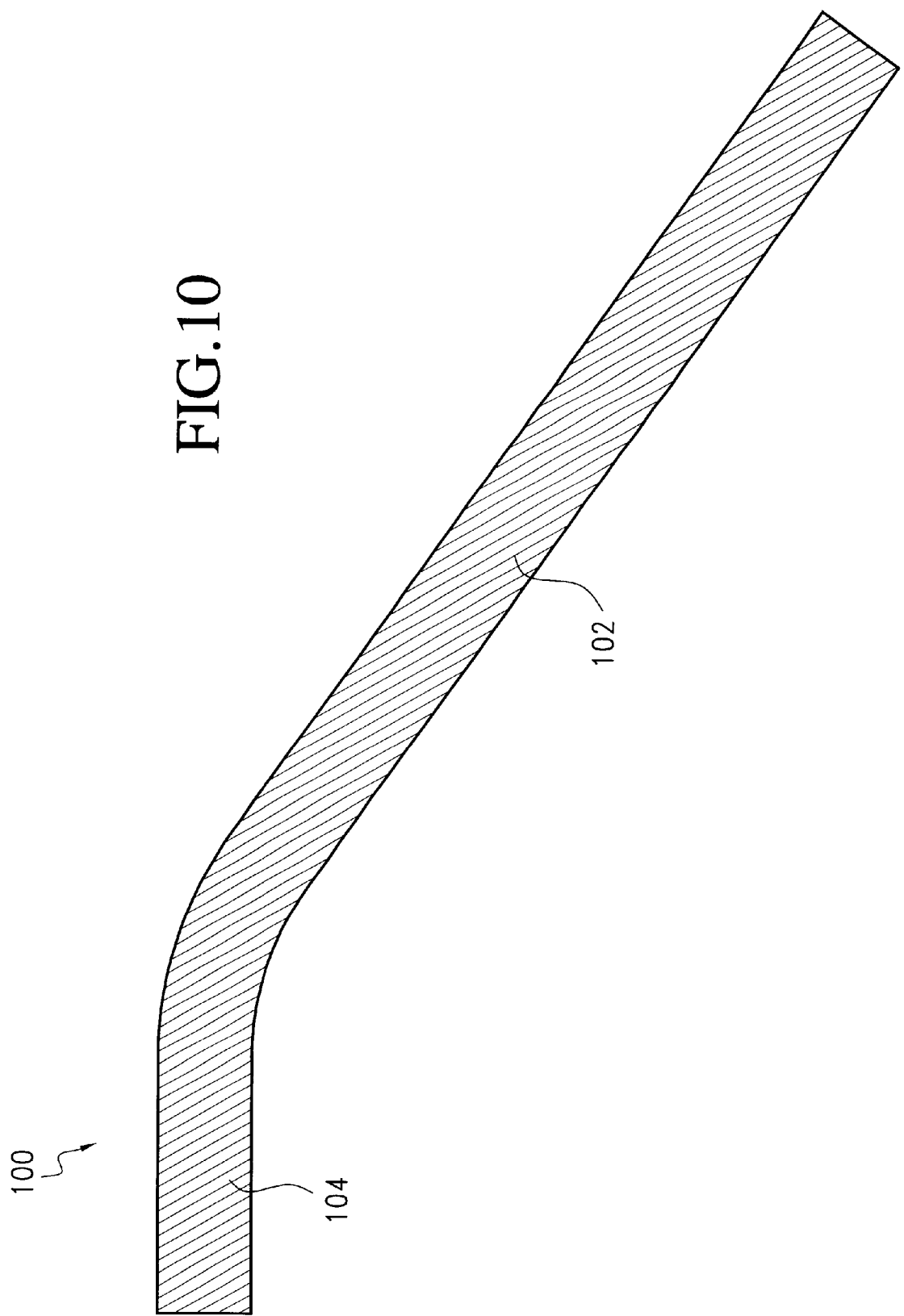
FIG. 10 is a sectional view of a tenth embodiment of the present invention.

FIG. 10 illustrates a mandrel assembly 100 using a single solid metal, flexible, rod bent into a main body mandrel 102 and a tip mandrel 104. It will be appreciated that the flexible metal mandrel is bent to form a bent tip shaft.

Figure 11:
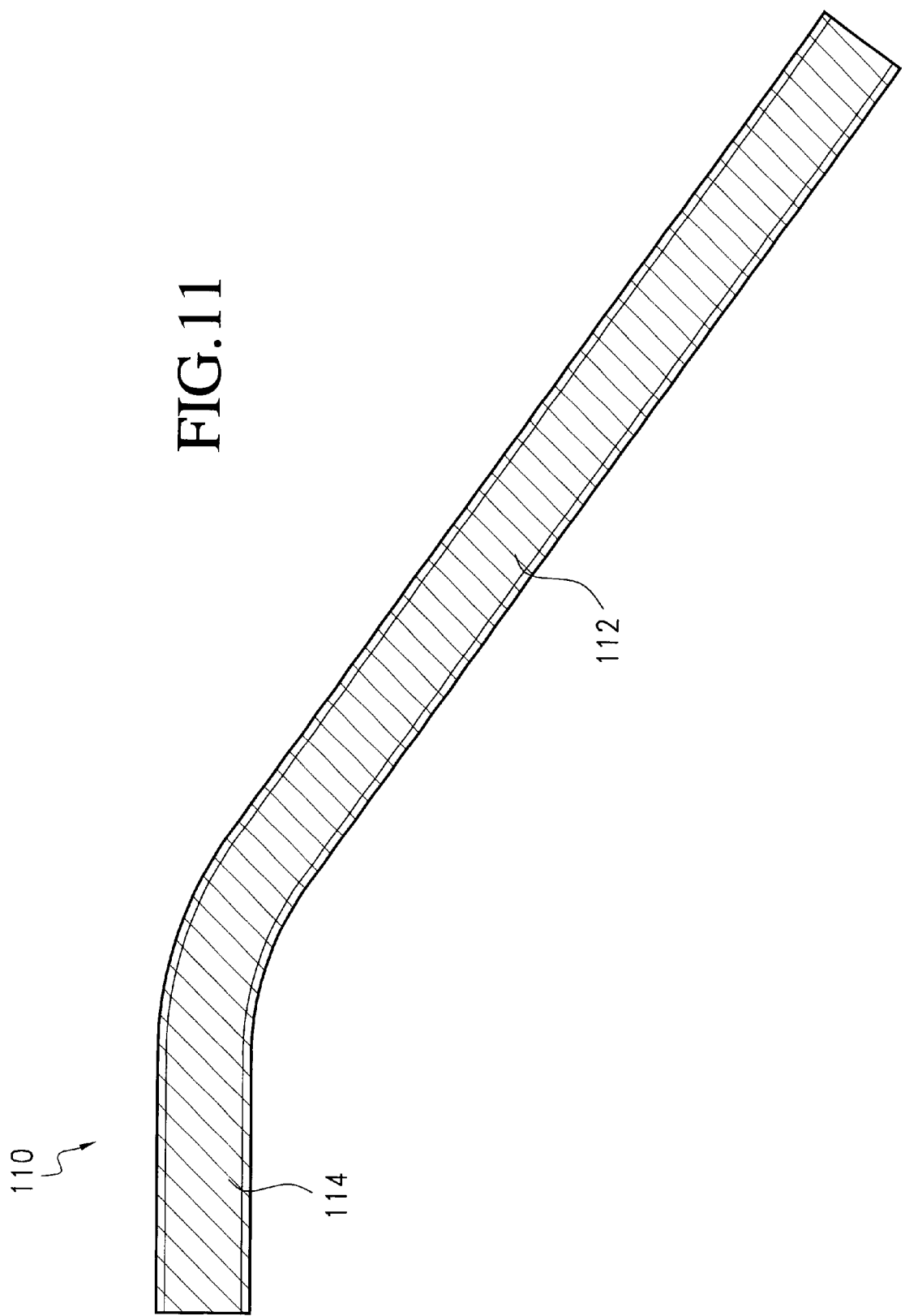
FIG. 11 is a sectional view of a eleventh embodiment of the present invention.

FIG. 11 shows a mandrel assembly 110 using a single piece of wound spiral metal to form a main body mandrel 112 and tip mandrel 114.

It will be appreciated that when a bladder assembly is used in any of the above described embodiments, the prepreg material is wrapped over the bladder before being placed in a mold and cured. If a bladder is not used, the prepreg material is wrapped directly over the mandrel before being placed in a mold and cured.

While various preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. Apparatus for molding a rigid, composite golf club shaft with a bent tip comprising: a two-part golf club shaft mandrel; said two-part mandrel including a main body mandrel and a tip mandrel, said main body mandrel and said tip mandrel being formed of separate sections of elongated material;

said main body mandrel and said tip mandrel having non-connected ends in abutment to each the other; wherein said main body mandrel is metal and said tip mandrel is flexible, wound spiral metal;

and, said tip mandrel being able to be disposed at a pre-selected angle with respect to said main body mandrel.

2. Apparatus for molding a rigid, composite golf club shaft with a bent tip comprising:

a golf club shaft mandrel for molding a rigid, composite golf club shaft with a bent tip; said mandrel having a main body section and a flexible tip section; said mandrel being formed of a one-piece, unitized, elongated bar of material; wherein said bar of material is wound spiral metal;

and, said flexible tip section being able to be disposed at a pre-selected angle with respect to said main body section.

3. Apparatus for molding a rigid, composite golf club shaft with a bent tip comprising:

a two-part, golf club shaft mandrel;

said two-part mandrel including a main body mandrel and a tip mandrel, said main body mandrel and said tip mandrel being formed of separate sections of elongated material;

said main body mandrel and said tip mandrel having non-connected ends in abutment to each the other; further including a permanent elbow between and abutting said main body mandrel and said tip mandrel;

and, said tip mandrel being able to be disposed at a pre-selected angle with respect to said main body mandrel.

* * * * *